Patented Apr. 20, 1954

2,676,105

UNITED STATES PATENT OFFICE 2,676,105

SHELL EGG TREATMENT

Joseph E. Sherman and Lloyd B. Jensen, Chicago, Ill., assignors to Swift & Company, Chicago, Ill., a corporation of Illinois No Drawing. Application April 14, 1952, Serial No. 282,272

2 Claims. (Cl. 99—113)

The present invention relates in general to the treatment of eggs, and more particularly to a method for the treatment of whole eggs in the shell to modify or fortify the contents of such eggs. This application is a continuation-in-part of our earlier-filed application, Serial No. 241,384, entitled, "Fermentation of Eggs," filed August 10, 1951.

Dried egg products are now produced on a large scale commercially and have proven highly successful due to the ease of shipment and storage thereof. It has heretofore been recognized that the whipping and keeping properties of both dried whole eggs and dried egg whites are greatly improved by a fermentation treatment of the egg material before drying. In general, the fermentation processes of the prior art have been restricted to the treatment of egg whites alone, since whole egg mixtures when held for the length of time required for fermentation tend to spoil readily. In all cases the general procedure has been to break the eggs out of their shells and then to add either to the whites alone, or in some instances to a mixture of the liquid whites and yolks, a culture of fermenting microorganisms. The inoculated mixture has then been held at an incubating temperature around 100° F. for a sufficient period of time to substantially deplete the sugar content of the eggs, and the resultant product dried by discharge into a drying chamber in the form of a spray or by other suitable means. Rapidity of fermentation is the aim of all successful processes of dried egg production, since upon this factor depend the desirable whipping characteristics of the product. Inhibiting agents present in the egg, as for example lysozyme, tend to retard fermentation and to require longer periods of incubation in order to secure the desired reduction in sugar content.

It is, therefore, an object of the present invention to provide a method for conditioning shell eggs prior to actual fermentation.

An additional object is to provide a method for decreasing the actual time required for fermentation of whole eggs or of egg whites.

A further object of the invention is to provide a method for overcoming the inhibitory action on fermentation of agents, such as lysozyme or the like, which are normally present in eggs.

In addition to the fermentation of eggs for dried egg production, the method of the present invention is applicable to the treatment of whole, unbroken shell eggs for a variety of other purposes. By the method of this invention, as hereinafter described, it is possible to treat fertile eggs so as to incorporate within the egg suitable vitamins and other nutrilites adapted to improve the quality of the chicks and poults produced from such eggs. It is also possible to add various other modifiers to the egg material within the unbroken shell for experimental purposes and the like.

Therefore, it is a further object of this invention to provide a method for incorporating modifying agents generally within the unbroken shells of whole eggs.

It is an additional object of the invention to provide a method for incorporating vitamins within the unbroken shells of whole eggs.

A still further object of the invention is to provide a method for incorporating reagents which will modify or fortify the contents of unbroken whole eggs in such eggs.

Additional objects, if not specifically set forth herein, will be readily apparent to one skilled in the art from the following detailed description of the invention:

Generally, the present invention comprises inoculating unbroken whole eggs in the shell with modifying or fortifying agents whereby the properties of the eggs so treated are altered in any desired fashion.

More specifically, one modification of the present invention contemplates the treatment of whole eggs, while still in the shell, by a fluid medium containing fermenting microorganisms under such conditions that the maximum number of such microorganisms are permitted to pass through the shells of the eggs and into the egg magma. These microorganisms by their introduction or inoculation into the egg before the shell is broken, become acclimatized or habituated to the egg magma and its inhibiting agents such as lysozyme. The eggs, treated in accordance with this invention, should be held for at least 24 hours at a temperature of about 70° F. to 100° F. immediately before breaking in order to permit the acclimatizing process to take place within the eggs. The eggs may be then broken in the conventional manner and the whites separated out if desired.

The liquid egg material, either the whites alone or mixtures of the whites and yolks, is then placed under incubating conditions, as more fully described below, until substantially complete fermentation has taken place. It has been found that a sufficiently heavy inoculation of fermenting microorganisms normally takes place in the conditioning treatment to effect a rapid and satisfactory fermentation of the egg material after it is broken out and incubated. However, it is considered within the scope of the present invention to supplement the conditioning inoculation by the use of additional cultures of bacterial agents edded to the broken-out egg material if desired.

While it is considered within the scope of this phase of the present invention to use any of the known fermenting cultures in the conditioning inculation of the shell eggs, it has been found that the following cultures produce good results: Lactobacilli, yeast (Sacc. cerevisae), and *Aerobacter aerogenes*. Some cultures will not produce optimum results, although operative to an extent, as for example *Lactobacillus bulgaricus*.

The conditioning inoculation is carried out by treatment of the shell eggs in a fluid medium containing the desired fermenting microorganisms. Either a culture broth or inoculated water may be used. Unlike oils or gases, these microorganisms will not penetrate the egg shells except under specific conditions. It is necessary to create a differential pressure in the egg whereby, in effect, the microorganisms pass into the egg under the influence of suction. This is done by maintaining a relative difference in temperature between the egg and the fluid medium of about 50°–105° F.

In the preferred method, the shell eggs are thoroughly heated to a uniform temperature throughout of from about 90° to 105° F. They are then immersed in the culture broth or inoculated water which is maintained at about 40° F. Under these conditions the fermenting microorganisms are permitted to pass through the shells of the eggs and into the egg magma. A period of submersion or contact of the shells with the fluid, culture-containing medium of about 3 to 5 minutes is required for maximum penetration by the culture. After inoculation the eggs may be placed in cold storage, if desired, for periods up to 8 months before breaking out the contents. It is desirable to use these inoculated eggs within 6 months from inoculation for consistently good results. However, whether the inoculated eggs are to be broken out immediately, or are to be stored in cold storage for a considerable period of time before breaking, the inoculated eggs should be maintained for at least 24 hours immediately before breaking at a temperature within the range 70°–100° F. During this acclimatizing period, the fermentative microorganisms inoculated through the shell begin to multiply very slowly within the albumin of the eggs. The 24-hour period has been found sufficient to permit the acclimatizing process to take place to a sufficient extent to produce rapid fermentation upon breaking out of the egg material. Since the microorganisms multiply very slowly within the unbroken egg, acclimatizing periods in excess of 24 hours may be used, but because it is usually desirable to process the eggs as rapidly as possible it would only be under unusual circumstances that a period of much in excess of 24 hours would be used. At the end of the acclimatizing period, the inoculated eggs are broken out and vat-fermented, either as whites or as whole magma including yolks, in the conventional manner. The fermentation is stopped by lowering the temperature of the vat of fermented eggs to 40°–45° F. when the egg whites, for example, reach an acidity of pH 6.0. The time will vary from 3 to 18 hours for fermentation, depending on the particular microorganisms used. Conventional temperatures of from 90° F. to 105° F. are used in the fermentation of the eggs treated by the present method.

The term "fermenting microorganisms" as used in the appended claims is intended to cover any of the known bacterial cultures heretofore used in egg fermentation.

A further modification of the present invention comprises the introduction into the interior of unbroken egg shells of vitamins and/or other nutrilites. In this modification the eggs so treated are, of course, fertile eggs which are intended for subsequent hatching. The nutrients are added prior to incubation of the egg and aid in the producing of chicks and poults of superior quality. In addition, the nutrients added by the method of the present invention promote a more rapid growth, a lower death rate, and a greater resistance in the resulting chicks.

It is considered within the scope of the present invention to add any nutrilites desired, but it has been found of particular value to add such vitamins as thiamin, $B_{12}$, folic acid, other vitamins of the B complex, vitamin C, calcium, phosphorus, and essential amino acids. The manner of adding the water-soluble vitamins and other nutrilites is essentially the same as that hereinbefore described for the addition of fermenting microorganisms. Mixtures of the water-soluble vitamins are used in the bath instead of microorganisms. A temperature differential between the egg and the fluid bath is maintained, resulting in a differential pressure in the egg whereby, in effect, the water-soluble nutrilites pass into the egg under the influence of suction. It may be possible to use temperatures similar to those used when employing fermenting organisms; however, with fertile eggs it is preferable that the egg not be heated to a temperature in excess of about 80° F. in order to avoid any injury to the embryo. In such cases the temperature differential will not exceed about 40° F. and may range from about 10° F. to 40° F. Following treatment of the eggs by submersion in the fluid bath containing the nutrilites, as described supra in connection with the addition of fermenting microorganisms in the eggs, the inoculated eggs are placed in incubators for hatching in the usual manner.

Obviously, the scope of the present invention is not intended to be restricted to the specific modifiers or fortifying agents enumerated, it being intended to cover the addition of any suitable additive or modifier which may be desired to be incorporated within a whole egg having an unbroken shell. The term "nutrilite" as used in the appended claims is intended to cover any fortifying material such as vitamins, calcium, phosphorus, essential amino acids or the like other than those oil-soluble materials which in themselves are capable of passing through the egg shell without the requirement of differential temperatures.

Obviously, many modifications and variations of the invention hereinbefore set forth may be made without departing from the spirit and scope thereof, and therefore only such limitations should be imposed as are indicated in the appended claims.

We claim:

1. The method of treating fertile whole eggs which comprises heating unbroken shell eggs to a temperature of about 50° to 30° F., immersing said heated eggs in a liquid medium containing nutrilites for about 3 to 5 minutes, said liquid medium being maintained at a temperature of about 40° F., thereafter removing said eggs from said liquid medium and incubating the unbroken and treated eggs.

2. The method of treating fertile shell eggs which comprises: immersing the unbroken shell eggs having a temperature not exceeding about 80° F. in a liquid medium containing a nutrilite, said liquid medium being maintained at a temperature of about 10° F. to 50° F. lower than that of said eggs; and maintaining said eggs in said medium for at least about three minutes to permit maximum penetration of said eggs by said nutrilite.

References Cited in the file of this patent

UNITED STATES PATENTS

| Number | Name | Date |
|---|---|---|
| 1,635,843 | Hofmann | July 12, 1927 |
| 2,460,986 | Josh et al. | Feb. 8, 1949 |
| 2,476,412 | Harris | July 9, 1949 |
| 2,477,752 | Kiss | Aug. 2, 1949 |
| 2,568,917 | Gray | Sept. 25, 1951 |
| 2,595,808 | Napper | May 6, 1952 |

FOREIGN PATENTS

| Number | Country | Date |
|---|---|---|
| 166,927 | Great Britain | July 20, 1921 |